UNITED STATES PATENT OFFICE.

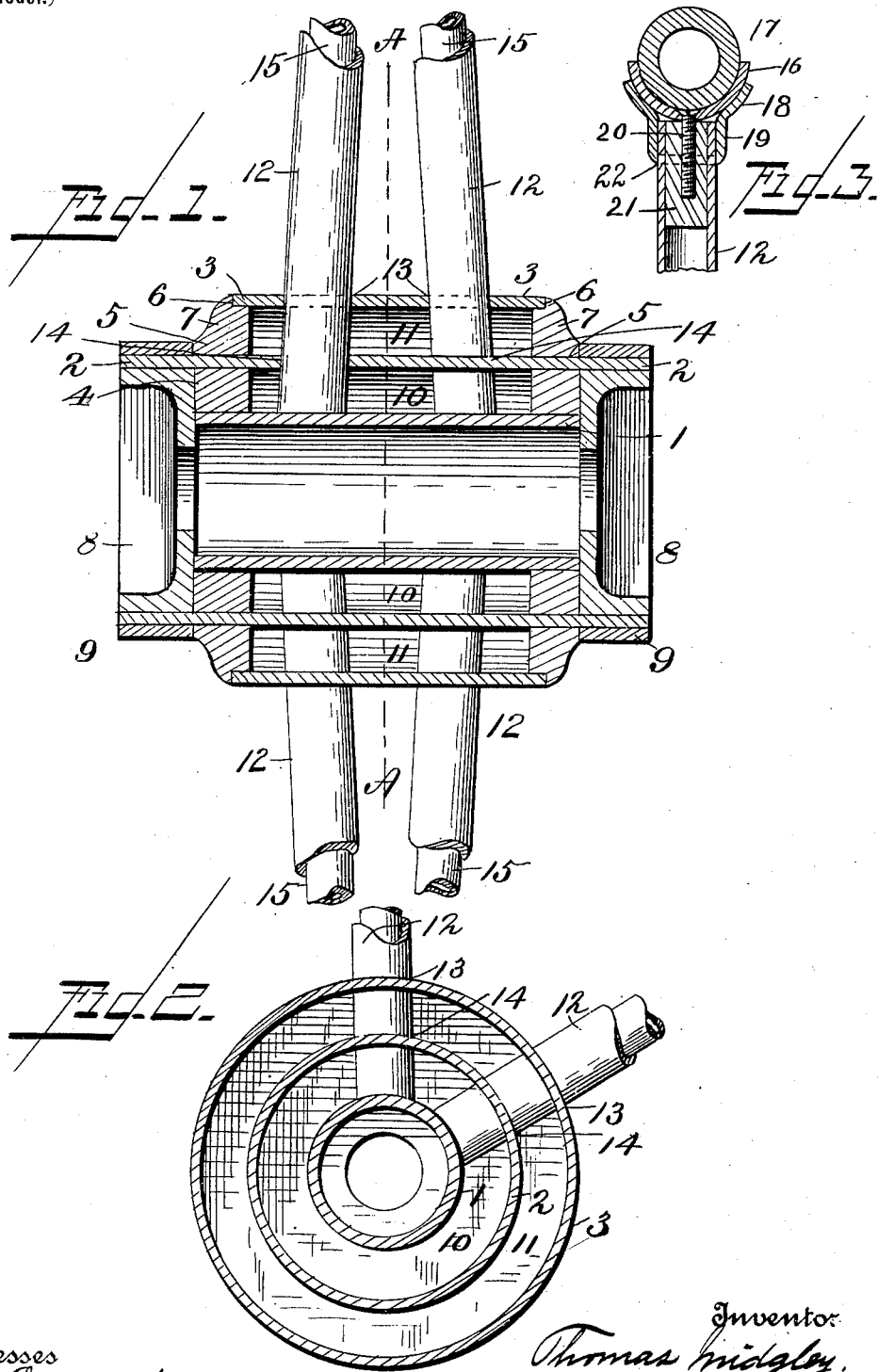

THOMAS MIDGLEY, OF COLUMBUS, OHIO.

METALLIC VEHICLE-WHEEL.

SPECIFICATION forming part of Letters Patent No. 660,728, dated October 30, 1900.

Application filed July 7, 1900. Serial No. 22,845. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Vehicle-Wheels; and I do hereby declare the following to be a full, clear, and exact description of the invention, such as will enable others skilled in the art to which it appertains to make and use the same.

My invention relates to vehicle-wheels, has especial reference to metallic wheels, and consists in certain improvements in construction, whereby the several parts of the wheel are joined together without screw-threads, as will be fully disclosed in the following specification and claims.

In the accompanying drawings, which form part of this specification, Figure 1 represents a vertical longitudinal section of the hub of a vehicle-wheel, the spokes being shown in side elevation; Fig. 2, a transverse section on line A A; and Fig. 3, a transverse section of the rim, the tire, and the outer end of one of the spokes.

Reference being had to the drawings and the numerals thereon, 1 indicates the inner tubular section of the hub; 2, the intermediate section; 3, the outer section; 4, an annular ring between sections 1 and 2, and 5 an annular ring between sections 2 and 3, one of each of said annular rings being placed at each end of the hub, and the ring 5 may be provided with a rabbet 6 to receive the end of the section 3, as shown in Fig. 1, and is provided with an ogee 7 to give configuration to the hub, as shown in the same figure. The concentric sections are of different lengths, the inner section 1 extending to the outer faces of the ring 4, the section 2 extending the entire length of the hub, and the section 3 overlapping the inner and adjacent faces of the rings 5 and preferably resting in the rabbets 6 in said rings.

At each end of the hub is a ball-bearing 8, and upon the section 2, surrounding each end thereof, is a reinforcing-band 9.

The concentric sections 1, 2, and 3 and the rings 4 and 5 form the walls of two concentric spoke-chambers 10 and 11, into which the tubular spokes 12 are inserted through openings or holes 13 in the section 3 and 14 in section 2, and the spokes are reinforced at their inner ends by the insertion of tubular pieces 15.

16 indicates the metallic rim of the wheel to receive a tire 17 and is provided with an auxiliary or supplemental concentric rim 18, having a channel 19, into the holes 22 of which the outer ends of the spokes 12 extend and are attached to the rim 16 by a screw 20, countersunk in the rim 16 and engaging the solid reinforce 21 in the end of the spoke.

The concentric sections composing the hub and having spoke-openings punched in them are properly assembled, the spokes inserted in the hub and rim, and all the parts properly pinned together, when the wheel is dipped in a bath of molten metal, preferably brass, and all the parts metallically joined, brazed, or soldered together, forming a homogeneous wheel, in that there is a sameness of kind of material throughout the hub, the spokes, and the rim, and all the parts are joined together by the molten brass or solder, and all the parts are coated with a thin body of non-corrodible metal. The brazing or soldering alloy is maintained at a temperature to keep it in a molten state and to prevent its being chilled by the articles immersed in the bath for brazing or soldering, and the flux lying upon the surface of the metal is maintained at the temperature of the metal by contact therewith. The wheel is immersed through the flux into the molten metal and allowed to remain long enough for the metal to penetrate and fill all the joints and seams of the wheel, when it is slowly drawn out of the bath and the excess of metal stripped off by the flux.

Having thus fully described my invention, what I claim is—

1. In a vehicle-wheel, a hub having a plurality of concentric tubular metallic sections brazed or soldered together and forming a homogeneous body, and provided with spoke-chambers.

2. In a vehicle-wheel, a hub having a plurality of concentric tubular metallic sections and concentric rings between the sections brazed or soldered together and forming a homogeneous body, and provided with spoke-chambers.

3. In a vehicle-wheel, a hub having a plurality of concentric tubular metallic sections brazed or soldered together and forming a homogeneous body, and spokes brazed or soldered in the hub.

4. In a vehicle-wheel, a hub having a plurality of concentric tubular metallic sections and concentric metallic rings between the sections brazed or soldered together and forming a homogeneous body, and spokes brazed or soldered in the hub.

5. In a metallic vehicle-wheel, a hub having a plurality of concentric tubular metallic sections brazed or soldered together, and a rim having a plurality of concentric metallic sections brazed or soldered together, and spokes brazed or soldered in the hub and the rim.

In testimony whereof I affix my signature in presence of two witnesses.

THOMAS MIDGLEY.

Witnesses:
 JOHN R. YOUNG,
 R. S. BRYANT.